(12) United States Patent
Shapiro

(10) Patent No.: US 8,868,916 B2
(45) Date of Patent: Oct. 21, 2014

(54) SELF-CONTAINED ELECTRONIC SIGNATURE

(75) Inventor: William Shapiro, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 179 days.

(21) Appl. No.: 13/249,795

(22) Filed: Sep. 30, 2011

(65) Prior Publication Data

US 2014/0019761 A1  Jan. 16, 2014

(51) Int. Cl.
*H04L 29/06* (2006.01)

(52) U.S. Cl.
USPC .......................................................... 713/176

(58) Field of Classification Search
USPC ................................................ 713/176, 180
See application file for complete search history.

(56) References Cited

U.S. PATENT DOCUMENTS

| | | | |
|---|---|---|---|
| 2003/0217275 A1* | 11/2003 | Bentley et al. | 713/184 |
| 2009/0164781 A1* | 6/2009 | Bouchard | 713/165 |
| 2010/0153167 A1* | 6/2010 | Kretzschmar et al. | 705/9 |

* cited by examiner

*Primary Examiner* — Jason Gee

(74) *Attorney, Agent, or Firm* — Kilpatrick Townsend & Stockton LLP

(57) ABSTRACT

Techniques for providing a self-contained electronic signature are disclosed. In some embodiments, techniques for providing a self-contained electronic signature include recording an audit trail for a plurality of events associated with an electronic signature of an electronic document; embedding the audit trail in the electronic document; and digitally signing the electronic document, in which the electronic document including the embedded audit trail and the electronic signature are secured by the digital signature. In some embodiments, the audit trail is embedded in metadata of the electronic document, a body of the electronic document, or both the metadata and body of the electronic document. In some embodiments, digitally signing the electronic document includes a certifying signature provided by a service provider of an electronic signature service.

23 Claims, 10 Drawing Sheets

SELF-CONTAINED ELECTRONIC SIGNATURE

BACKGROUND OF THE INVENTION

An electronic signature generally refers to any electronic data that carries the intent of a signature. For example, an electronic signature can be any electronic data that indicates that a person adopts the contents of the electronic document (e.g., a contract, a message, or any other electronic document).

BRIEF DESCRIPTION OF THE DRAWINGS

Various embodiments are disclosed in the following detailed description and the accompanying drawings.

DETAILED DESCRIPTION

Figure 1:
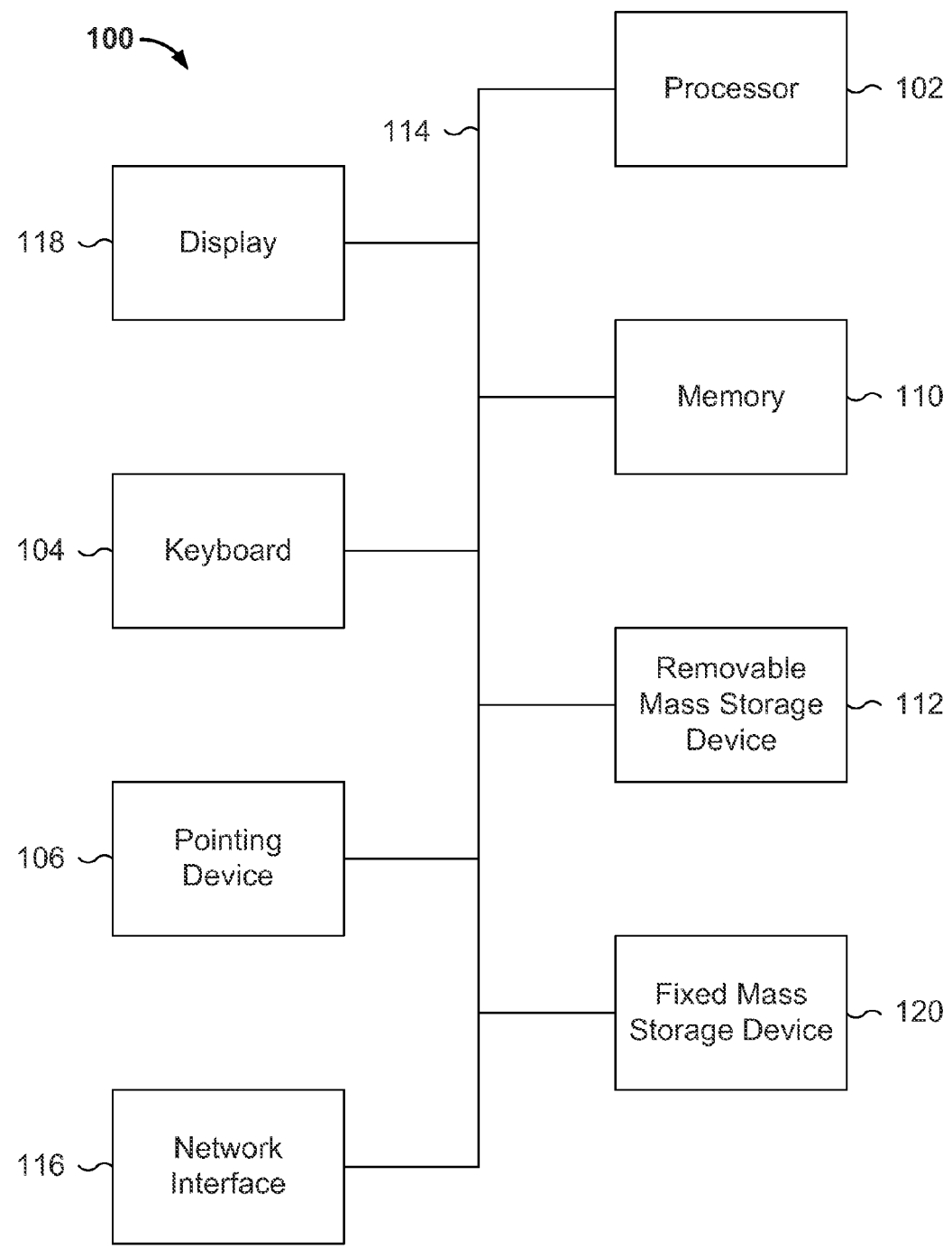
FIG. 1 is a functional diagram illustrating a programmed computer system for providing a self-contained electronic signature in accordance with some embodiments.

The techniques disclosed herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the implementations disclosed herein may take, may be referred to as techniques. In general, the order of the steps of disclosed processes may be altered within the scope of the techniques disclosed herein. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate the principles of the techniques disclosed herein. The techniques disclosed herein are described in connection with such embodiments, but the techniques disclosed herein are not limited to any embodiment. The scope of the techniques disclosed herein are limited only by the claims and encompass numerous alternatives, modifications and equivalents. Numerous specific details are set forth in the following description in order to provide a thorough understanding of the techniques disclosed herein. These details are provided for the purpose of example and the techniques disclosed herein may be practiced according to the claims without some or all of these specific details. For the purpose of clarity, technical material that is known in the technical fields related to the techniques disclosed herein has not been described in detail so that the techniques disclosed herein are not unnecessarily obscured.

An electronic signature generally refers to any electronic data that carries the intent of a signature. For example, an electronic signature can be any electronic data, such as a click-through (e.g., clicking an acceptance/agree button), a typed signature, a computer generated signature for a user, a scanned signature for a user, a voice recording, a finger swipe, a photo or video of a user, a biometric reading (e.g., finger print, iris scan, voice print, or another biometric measure), that indicates that a person adopts the contents of the electronic document (e.g., a contract, a message, or any other electronic document). Example commercial products for providing electronic signatures for electronic documents include Adobe EchoSign® and Adobe eSignatures®.

Digital signatures are generally used for verifying the authenticity of a digital message or digital document. Digital signatures are commonly used for applications in which it is important to detect forgery or tampering. For example, a valid digital signature verified by a recipient allows the recipient to determine that the message was not altered or tampered with in transit or while in storage after being digitally signed. Digital signatures or encrypted digital signatures are commonly used for software distribution, financial transactions, securing electronic mail messages, securing digital documents, and in other cases in which it is important to detect forgery or tampering and verifying the authenticity of the electronic document. Digital signatures generally use asymmetric cryptography techniques (e.g., implemented using Public Key Infrastructure (PKI)).

Electronic documents can be digitally signed. Electronic documents can be anything representable as a bitstring. Example electronic documents that can be digitally signed include electronic mail, electronic copies/versions of contracts, a message sent via some other cryptographic protocol, and an electronic version of a scanned paper document (e.g., an Adobe PDF® format of a scanned contract or other physical document).

Electronic signatures for signing electronic documents are becoming increasingly common. Unlike a digital signature, electronic signatures do not require that signatories use a smartcard, dongle, or public key infrastructure (PKI) to sign an electronic document (e.g., in which a user must have a digital certificate that has been issued to the user in order to digitally sign the document).

Information surrounding the circumstances and events associated with electronic signatures are generally important to determine or show that a given user or person associated with, for example, that user's e-mail address or login for an electronic signature service, electronically signed a given document. For example, such information can include an email with a link to the document and actions/events for each transaction including login and timestamp, clicked accept and timestamp, and possibly other actions/events. This information is generally referred to herein as audit trail data.

As a result, information about an electronic signature (e.g., audit trail data) often needs to be stored for several years and can often be difficult to manage and access at a later date and time. For example, the audit trail can contain data associated with the events related to the electronic signing of the electronic document, and can be stored in a database of an electronic signature service provider, in which the electronic document itself may be maintained/stored elsewhere (e.g., not stored on the same system), and the proof of the authenticity of the document (e.g., a hash of the electronic document) may be stored in yet another system. As a result, having the electronic document itself is insufficient for verifying the authenticity of the electronic document and the electronic signatures. The user of such an electronic signature platform/ service must be confident that all of this ancillary necessary information continues to be preserved and accessible, and for example, the user must hope that the service is not terminated or that the service provider does not go out of business or have a catastrophic failure at the service provider's data computing site.

Thus, what are needed are techniques for providing a self-contained electronic signature. In some embodiments, a self-contained electronic signature provides each of the electronic signatures as well as the audit trail associated with each of the electronic signatures in the electronic document itself, and the electronic document is digitally signed (e.g., certified by a certifying party using a certifying signature) to thereby secure the electronic document as well as the electronic signatures and the audit trail data (e.g., which can both be embedded in the electronic document, such as in the body of the electronic document, the metadata of the electronic document, or both). Accordingly, such an electronic document with a self-contained electronic signature maintains all of the necessary information to verify the electronic signature(s). Also, such an electronic document with a self-contained electronic signature allows for verifying the electronic signature(s) while working offline, because a remote server (e.g., electronic signature service) does not need to be contacted to obtain the secured/verified audit trail and to verify the authenticity of the electronic document.

Accordingly, techniques for providing a self-contained electronic signature are disclosed. In some embodiments, techniques for providing a self-contained electronic signature include recording an audit trail for a plurality of events associated with an electronic signature of an electronic document; embedding the audit trail in the electronic document; and digitally signing the electronic document, in which the electronic document including the embedded audit trail and the electronic signature are secured by a digital signature. In some embodiments, the audit trail is embedded in metadata of the electronic document (e.g., in XMP metadata), a body of the electronic document (e.g., appended to the bottom of the document), or both the metadata and body of the electronic document. In some embodiments, digitally signing the electronic document includes a certifying signature provided by a service provider of an electronic signature service.

In some embodiments, the electronic signature service also allows for users to specify an electronic document workflow input for electronic signature workflow processing. In some embodiments, techniques for providing a self-contained electronic signature further includes receiving recipient information for a first signing party; sending a notification to the first signing party to sign the electronic document; storing the first signing party's electronic signature in the electronic document; and storing an audit trail associated with the first signing party's electronic signature in the electronic document.

In some embodiments, techniques for providing a self-contained electronic signature include verifying an authenticity of a digitally signed electronic document, in which the electronic document includes an embedded audit trail and an electronic signature secured by a digital signature; displaying the electronic signature; and receiving a request to display the embedded audit trail. In some embodiments, the audit trail is embedded in metadata of the electronic document, a body of the electronic document, or both the metadata and body of the electronic document, and digitally signing the electronic document includes a certifying signature provided by a service provider of an electronic signature service. In some embodiments, a copy of the digitally signed electronic document is stored by an online e-signature service (e.g., an archived version or backup copy can be stored by a cloud service or web service or other online service for an e-signature service, in which the document can be identified based on a unique document/version number or based on other techniques, such as a document hash).

FIG. 1 is a functional diagram illustrating a programmed computer system for providing a self-contained electronic signature in accordance with some embodiments. As shown, FIG. 1 provides a functional diagram of a general purpose computer system programmed to perform providing a self-contained electronic signature in accordance with some embodiments. As will be apparent, other computer system architectures and configurations can be used to perform context-sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide the various computer/computer implemented functional elements and/or executes/performs the processes described below with respect to FIGS. 2 through 10.

Processor 102 is coupled bidirectionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable non-transitory computer readable storage media, described below, depending on whether, for example, data access needs to be bidirectional or unidirectional. For example, processor 102 can also directly and very rapidly retrieve and store frequently needed data in a cache memory (not shown).

A removable mass storage device 112 provides additional data storage capacity for the computer system 100, and is coupled either bidirectionally (read/write) or unidirectionally (read only) to processor 102. For example, storage 112 can also include computer-readable media such as magnetic tape, flash memory, PC cards, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems, as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection, as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch sensitive displays, transducer card readers, tape readers, voice or handwriting recognizers, biometric readers, cameras, portable mass storage devices, and other computers.

In addition, various embodiments disclosed herein further relate to computer storage products with a computer readable medium that includes program code for performing various computer-implemented operations. The computer readable medium is any data storage device that can store data which can thereafter be read by a computer system. Examples of computer readable media include, but are not limited to: all the media mentioned above, magnetic media such as hard disks, floppy disks, and magnetic tape, optical media such as CD-ROM disks, magneto-optical media such as optical disks, and specially configured hardware devices, such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized (e.g., server devices, appliances with hardware configured for specific functions, such as a web server or an application server, and/or various other types of computing devices that can execute various operating systems and/or virtual machine software techniques).

Figure 2:
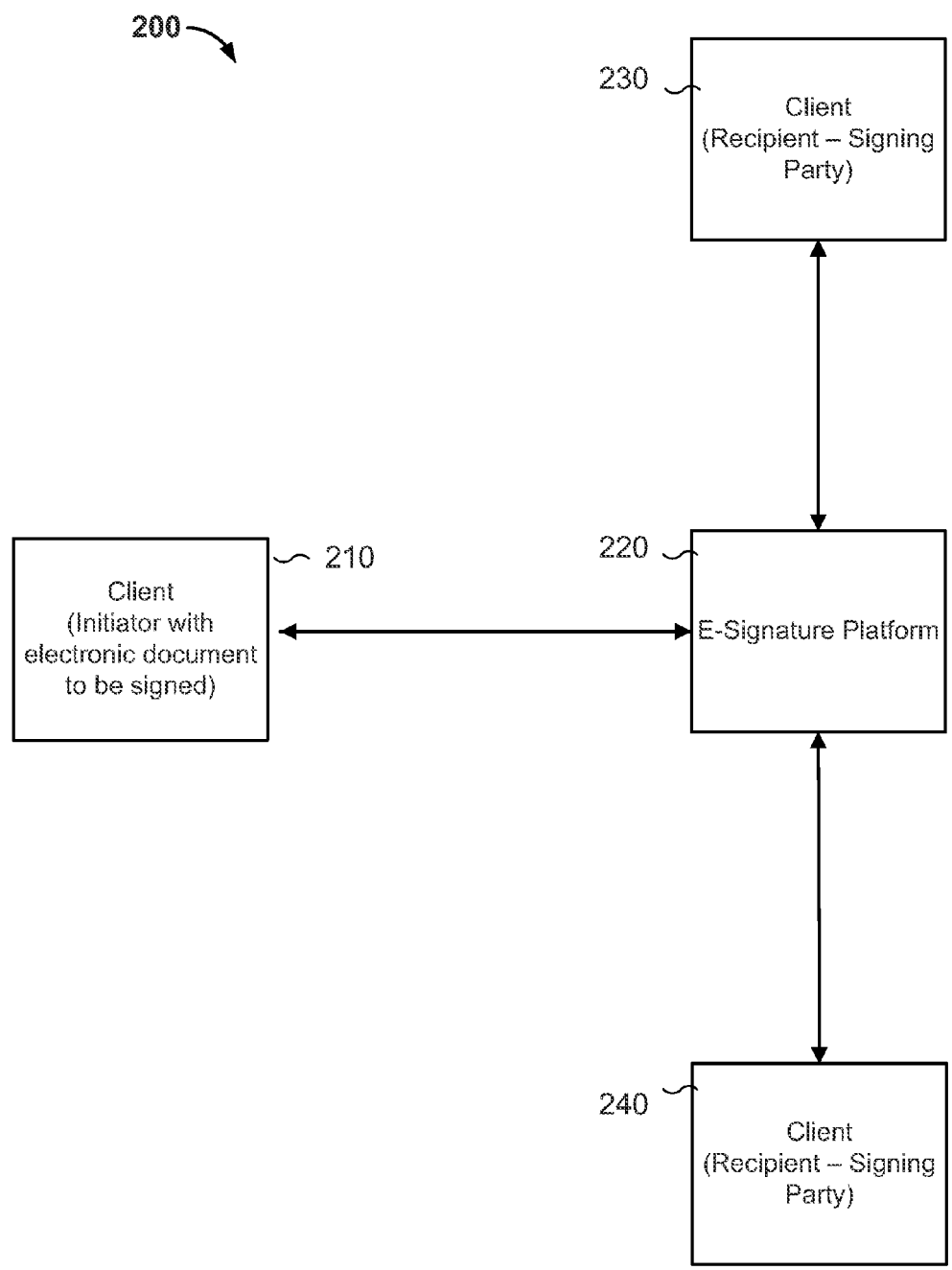
FIG. 2 is a block diagram for providing a self-contained electronic signature in accordance with some embodiments.

FIG. 2 is a block diagram for providing a self-contained electronic signature in accordance with some embodiments. As shown, a client 210 initiates an electronic signing of an electronic document using an electronic signature (e-signature) platform 220. For example, the e-signature platform 220 can be a web based service that users can interact with via a browser to interact with a web site and/or that users can interact with an application executed on a smart phone and/or tablet or other computing device. In this example, the electronic document is to be signed by two different signing parties (e.g., the recipients). The user initiating the electronic document for e-signatures (e.g., the initiator) can identify each of these two parties (e.g., including their respective e-mail addresses). The e-signature platform 220 can notify each of the parties via electronic mail (e-mail). Each of these notified signing parties can then electronically sign the electronic document using their respective client devices 230 and 240 interacting with the e-signature platform 220 (e.g., which can be via a secure communication protocol, such as the Secure Sockets Layer (SSL) protocol or other secure communication protocols). In some embodiments, the e-signature platform 220 audits the electronic signing process. In some embodiments, the e-signature platform 220 embeds the audit trail data associated with the electronic signing process in the electronic document itself. In some embodiments, the e-signature platform 220 also embeds the electronic signatures in the electronic document itself. In some embodiments, the e-signature platform 220 also digitally signs the electronic document, in which the electronic document including the embedded audit trail and the electronic signature are thereby secured by the digital signature. In some embodiments, the audit trail is embedded in metadata of the electronic document, a body of the electronic document, or both the metadata and body of the electronic document. In some embodiments, digitally signing the electronic document includes a certifying signature provided by a service provider of an electronic signature service.

Figure 3:
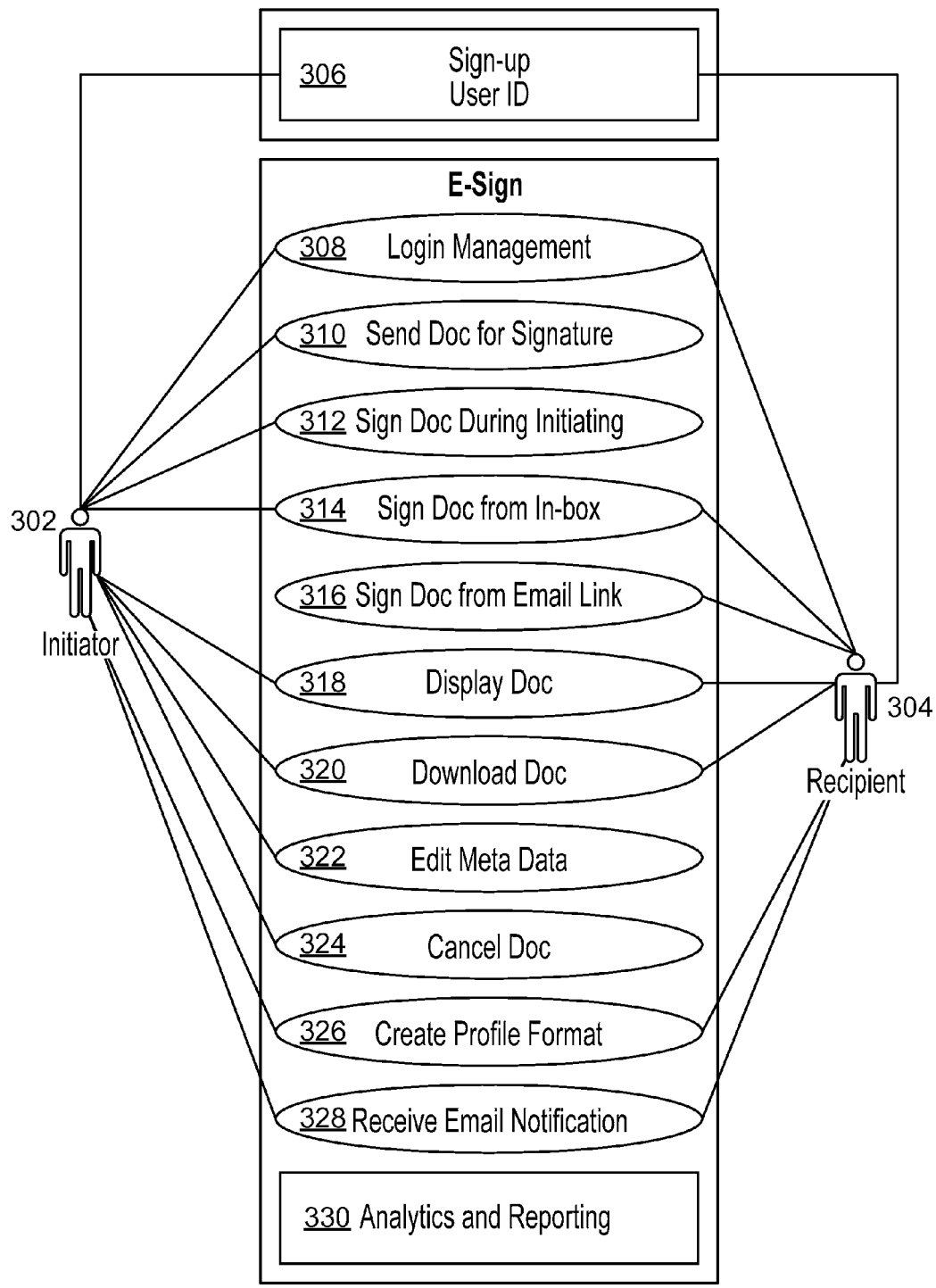
FIG. 3 is a use scenario diagram of an e-signature service for providing a self-contained electronic signature in accordance with some embodiments.

FIG. 3 is a use scenario diagram of an e-signature service for providing a self-contained electronic signature in accordance with some embodiments. In some embodiments, an e-signature service allows users to electronically sign various types of electronic documents (e.g., in PDF format and/or other electronic formats). Example electronic documents for electronic signing can include contracts, confidentiality agreements, consent forms, applications, and corporate documents (e.g., expense reports, vacation requests, and employment agreements), and various other types of documents. For example, the e-signature service can be offered as a subscription service or pay per use service.

Referring to FIG. 3, an initiator 302 and a recipient 304 must each have a user ID for the e-signature service platform and can sign-up to obtain a user ID and other credentials (e.g., a user password) at 306. In some embodiments, a user ID includes a valid and unique email address that can also be used for notifying of signature requests and process status. In some embodiments, each user also creates one or more signature profiles, which can include one or more of the following: first and last name, e-mail address, a seal or electronic signature preference (e.g., a computer generated electronic signature, a scanned copy of the user's handwritten signature, or another form of electronic signature), title and company (e.g., for corporate users), address information, and telephone number (e.g., if a user enters multiple profiles, such as for a personal signature and a business signature, then the user can select among the profiles when initiating a new electronic signature workflow or signing an electronic document using the e-signature service). At 308, initiator and recipient 308 login to the e-signature service platform. At 310, the initiator uploads the electronic document for electronic signing (e.g., the document can be converted into a common format, such as PDF format or another electronic document format) and specifies the recipient(s) for signing the electronic document. At 312, the initiator electronically signs the electronic document. In some embodiments, the e-signature service monitors the electronic signing and generates an audit trail associated with such electronic signing as described herein. At 314, the recipient and initiator can access the electronic document for electronically signing the electronic document using the e-signature service. At 316, the recipient electronically signs the electronic document, which is available via an e-mailed link to the document sent via e-mail to the recipient. In some embodiments, the e-signature service monitors the electronic signing and generates an audit trail associated with such electronic signing as described herein. At 318, the recipient and/or initiator can display the electronic document after clicking the emailed link to the electronic document. At 320, the recipient and/or initiator can download the electronic document. At 322, the initiator can edit metadata associated with the electronic document.

At 324, the initiator can cancel the workflow process for electronically signing the electronic document. For example, the initiator is able to cancel a document signing process before the document is executed. An email with the cancellation reason can be input by the initiator, which is sent to all recipients and the initiator regarding this activity. The document status can then show as "canceled", and the activity can also be audited.

At 326, the initiator and/or recipient can create a user profile format, as discussed above. At 328, the initiator and recipient receive an emailed notification with the signed document link (e.g., of the certified electronic document that has been signed by both/all required signatories). In some embodiments, the e-signature service embeds the electronic signatures as well as the audit trail associated with such electronic signing, and digitally signs the electronic document, as described herein with respect to various embodiments. At 330, various analytics and reporting can be performed by the e-signature service platform.

In some embodiments, the e-signature service audits various activities, including, for example, electronic document preparation activities, delivery activities, and electronic signing activities, and various other activities. In some embodiments, after all required signatories have electronically signed the document, every signatory's signature profile format (e.g., or their respective default signature profile) is appended to the last page of the original document sorted by the signing dates and then stamped with their respective seals. In some embodiments, the executed/signed document can be downloaded by the initiator and/or recipients. In some embodiments, the e-signature service stores or archives a copy of the executed/signed document (e.g., for backup retrieval purposes and can be associated based on a unique document number or transaction number associated with the electronically signed and certified document).

Figure 4:
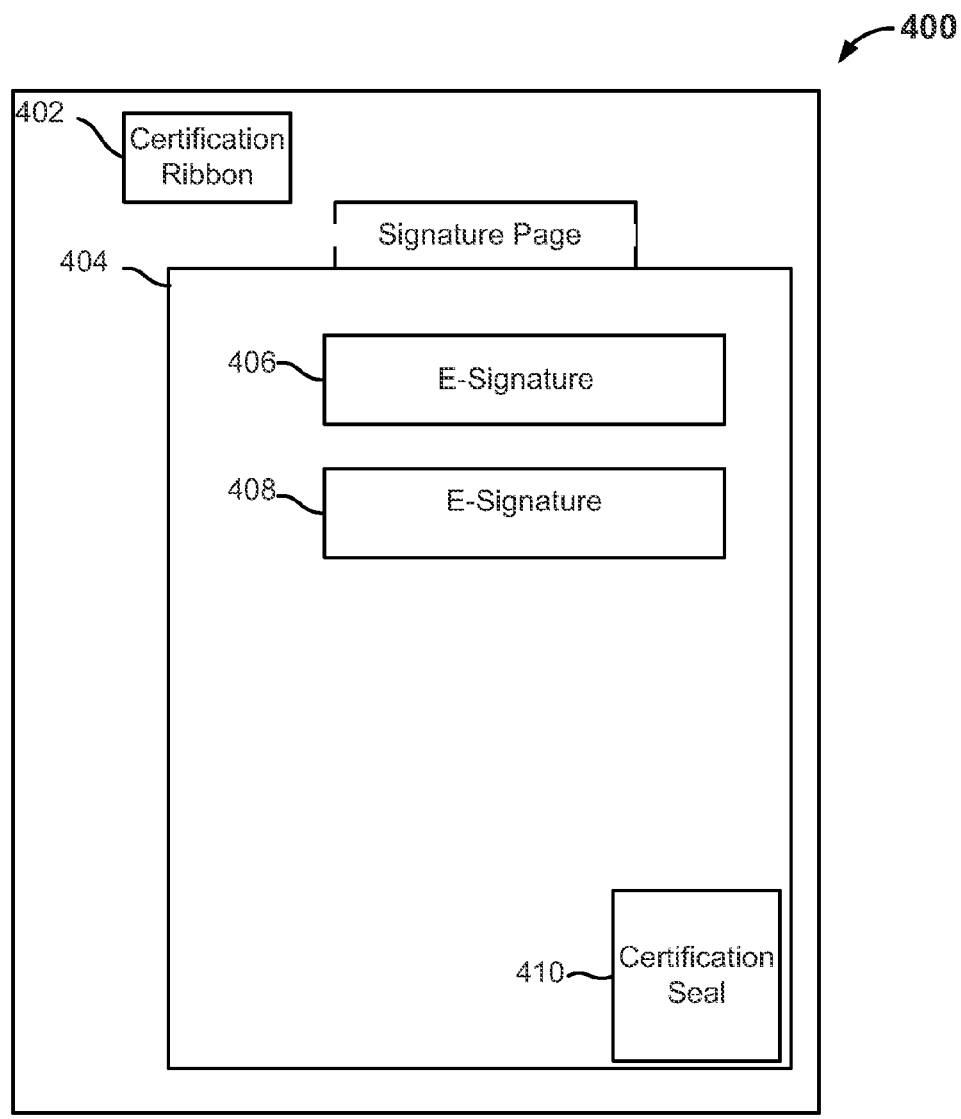
FIG. 4 is a functional diagram of a graphic user interface for providing a self-contained electronic signature in accordance with some embodiments.

FIG. 4 is a functional diagram of a graphic user interface for providing a self-contained electronic signature in accordance with some embodiments. As shown, an electronically signed document 400 includes a certification ribbon displayed at 402. In some embodiments, the certification indicator indicates whether or not the certified electronically signed document can be trusted or not. For example, the certification indicator can display a certification ribbon when the document can be trusted and can display a warning flag or other warning indicator when the document cannot be trusted (e.g., has potentially been tampered with or compromised since it was digitally signed, as the digital signature verification indicates that the document has been altered since it was digitally signed). As also shown, the signature page 404 of the electronic document includes seals or electronic signatures 406 and 408. A certification seal 410 is also displayed at the bottom of the signature page 404, which provides information about the certifying entity and the certified electronic document.

Figure 5:
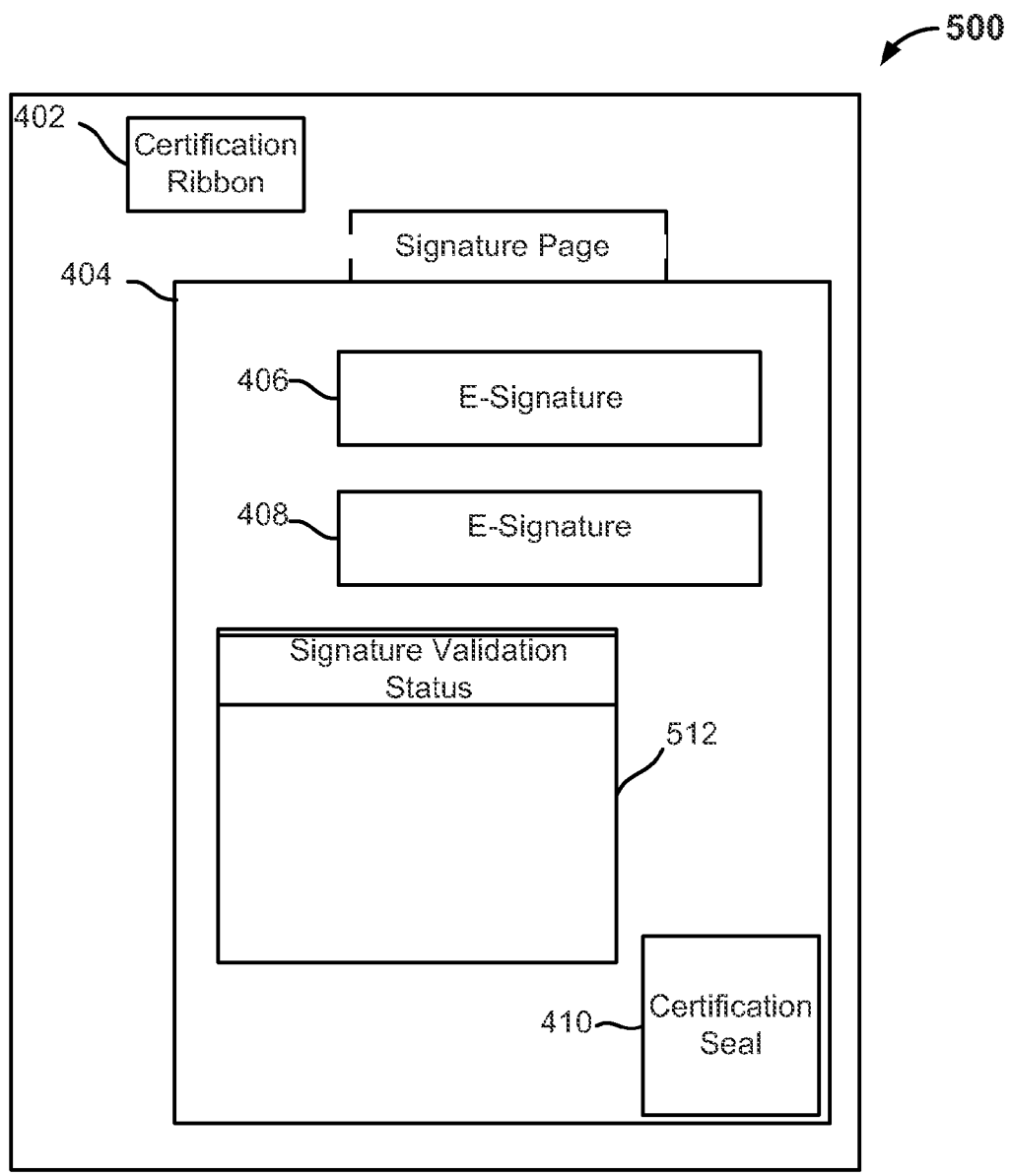
FIG. 5 is another functional diagram of a graphic user interface for providing a self-contained electronic signature in accordance with some embodiments.

FIG. 5 is another functional diagram of a graphic user interface for providing a self-contained electronic signature in accordance with some embodiments. In some embodiments, the certification seal 410 can be clicked or selected to obtain more information about the certifying entity and the certified electronic document. In some embodiments, clicking or selecting the certification seal 410 causes a display of a signature validation status window 512 as shown, which provides more information about the certifying entity and the certified electronic document including the audit trail data associated with each of the electronic signatures.

Figure 6:
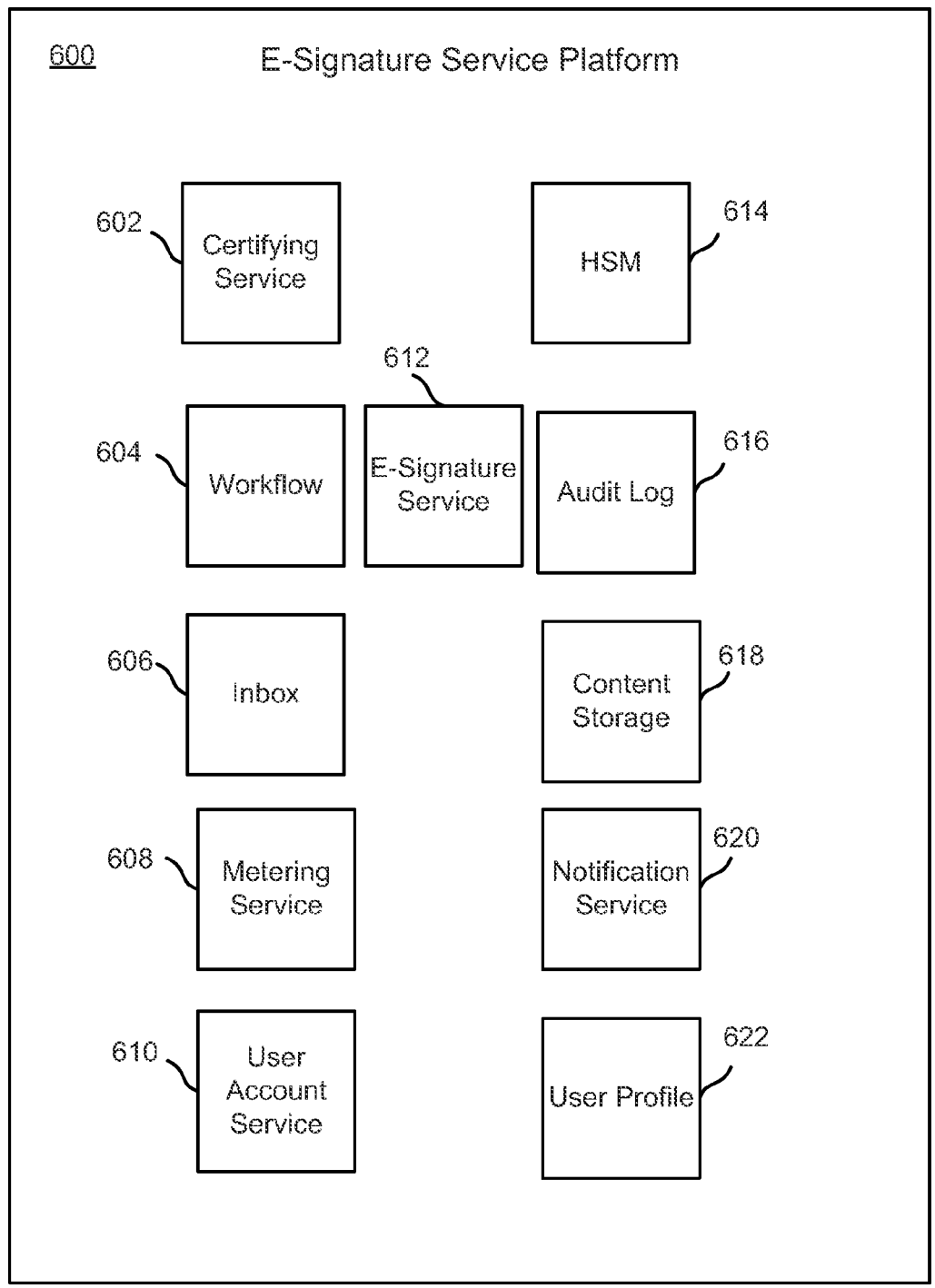
FIG. 6 is a functional block diagram of a logical architecture for providing a self-contained electronic signature in accordance with some embodiments.

FIG. 6 is a functional block diagram of a logical architecture for providing a self-contained electronic signature in accordance with some embodiments. As shown, an e-signature service platform 600 includes a certifying service 602, which uses a hardware security module (HSM) 614 for storing digital certificates for the certifying service 602.

The e-signature service platform 600 also includes a workflow function 604, which allows an initiator to specify a workflow for processing the electronic signature process for an electronic document (e.g., specifying signatories and an order of electronic signing, which can be in parallel and/or in sequence). The workflow 604 invokes an e-signature service 612 for providing for electronic signatures by each required signing party. In some embodiments, the electronic signatures are embedded in the electronic document. An audit log 616 monitors events surrounding the electronic signature of each signing party to generate an audit trail, as described herein. In some embodiments, the audit trail is embedded in the electronic document.

The e-signature service platform 600 also includes an inbox function. In some embodiments, a user's respective inbox can be accessed by the user to view their current inbox workflow items, such as documents requiring their action, such as for their electronic signatures. The e-signature service platform 600 also includes content storage 618. In some embodiments, the content storage 618 stores content, such as a copy of the electronic document during and possibly after the electronic signature workflow process is completed (e.g., for archival of such transactions), as described herein. The e-signature service platform 600 also includes a metering service 608. In some embodiments, the metering service 608 performs metering and billing functions for the e-signature platform. The e-signature service platform 600 also includes a user account service 610. In some embodiments, the user account service 610 provides for user account services, such as login and other account services for users of the e-signature service platform. The e-signature service platform 600 also includes a notification service 620. In some embodiments, the notification service 620 performs the e-mail and other notifications for the workflow processing, as described herein. The e-signature service platform 600 also includes a user profile 622. In some embodiments, the user profile 622 stores user profile information, as described herein.

In some embodiments, an electronic signature includes multiple different elements that can be located in different places, including a final signed document, the audit log related to the signature process, and the original digital copy of the electronic document. In some embodiments, a variety of information is used to determine the validity of an electronic signature. For example, information used to determine the validity of an electronic signature can include the electronic document containing the electronic signature(s) itself (e.g., an Adobe PDF® formatted electronic document or another formatted electronic document), a mechanism for establishing the authenticity of the electronic document, and an audit trail that provides information related to the electronic signing process.

In some embodiments, the relevant audit trail pertaining to the document is stored in the document itself. For example, the audit trail can be embedded as XMP data in a PDF formatted version of the electronic document. In some embodiments, the audit trail includes the details of when each recipient electronically signed the document, when the document was sent to each recipient for electronic signature, the time and date that such recipients logged into the system to perform actions relating to the document, and the signing ceremony for the document.

In some embodiments, an electronically signed document can be certified by a certifying service 602 (e.g., using a certifying signature, such as digitally signing the electronic document by the certifying service). For example, digital signatures (e.g., using PKI techniques) can be used for providing a certifying signature, which certifies the document. In some embodiments, a certifying signature is provided to ensure the authenticity of the electronically signed document. In some embodiments, a certifying signature is a digital signature that is applied by the e-signature service provider to secure the document after it has been digitally signed and embedded with the audit trail data associated with the electronic signatures. If someone attempts to modify the document after it has been digitally signed, the digital signature would be broken and the user can be notified accordingly (e.g., a certification ribbon can indicate a warning flag, as described herein). Also, the authenticity of the audit trail, which is embedded in the digitally signed document, is similarly protected by the same certifying signature.

Figure 7:
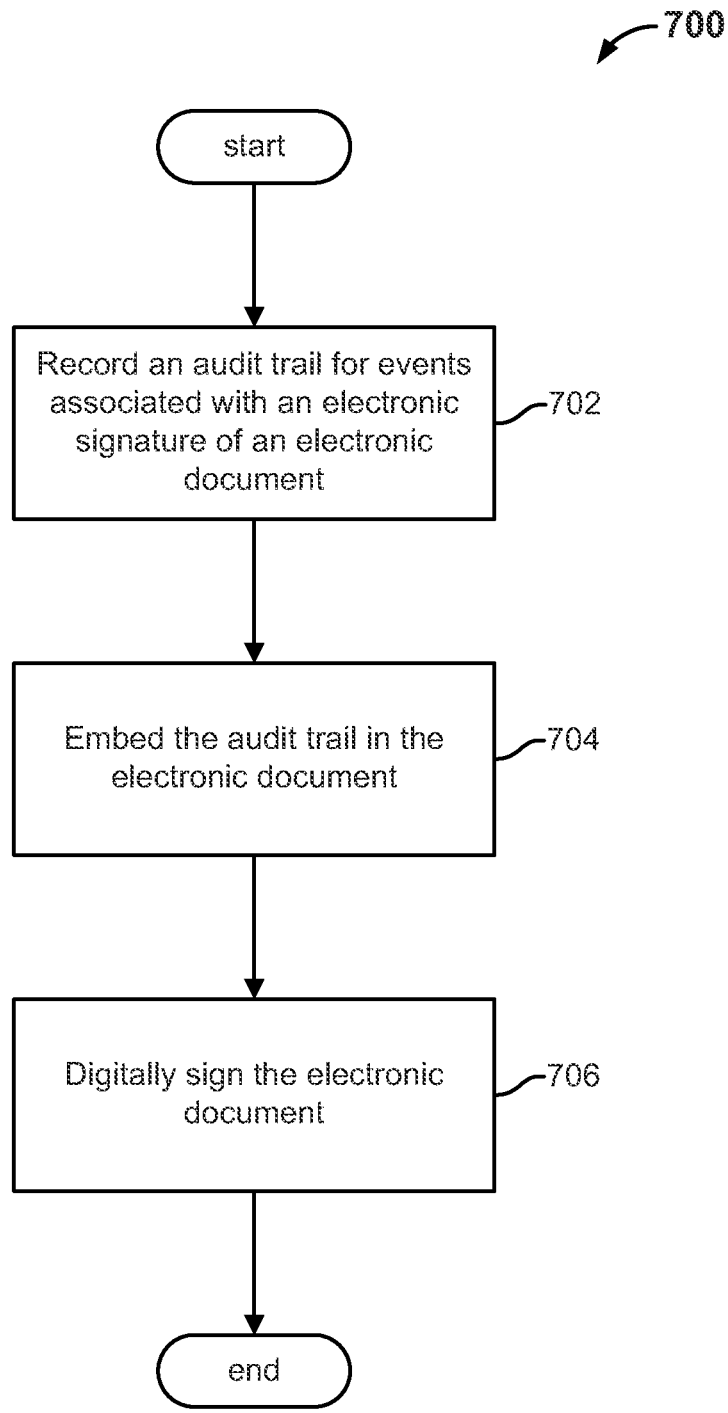
FIG. 7 is a flow diagram for providing a self-contained electronic signature in accordance with some embodiments.

FIG. 7 is a flow diagram for providing a self-contained electronic signature in accordance with some embodiments. At 702, recording an audit trail for a plurality of events associated with an electronic signature of an electronic document is performed. At 704, embedding the audit trail in the electronic document is performed. At 706, digitally signing the electronic document, in which the electronic document including the embedded audit trail and the electronic signature are secured by the digital signature is performed. In some embodiments, the audit trail is embedded in metadata of the electronic document (e.g., in XMP metadata), a body of the electronic document (e.g., appended to the bottom of the document), or both the metadata and body of the electronic document. In some embodiments, digitally signing the electronic document includes a certifying signature provided by a service provider of an electronic signature service.

Figure 8:
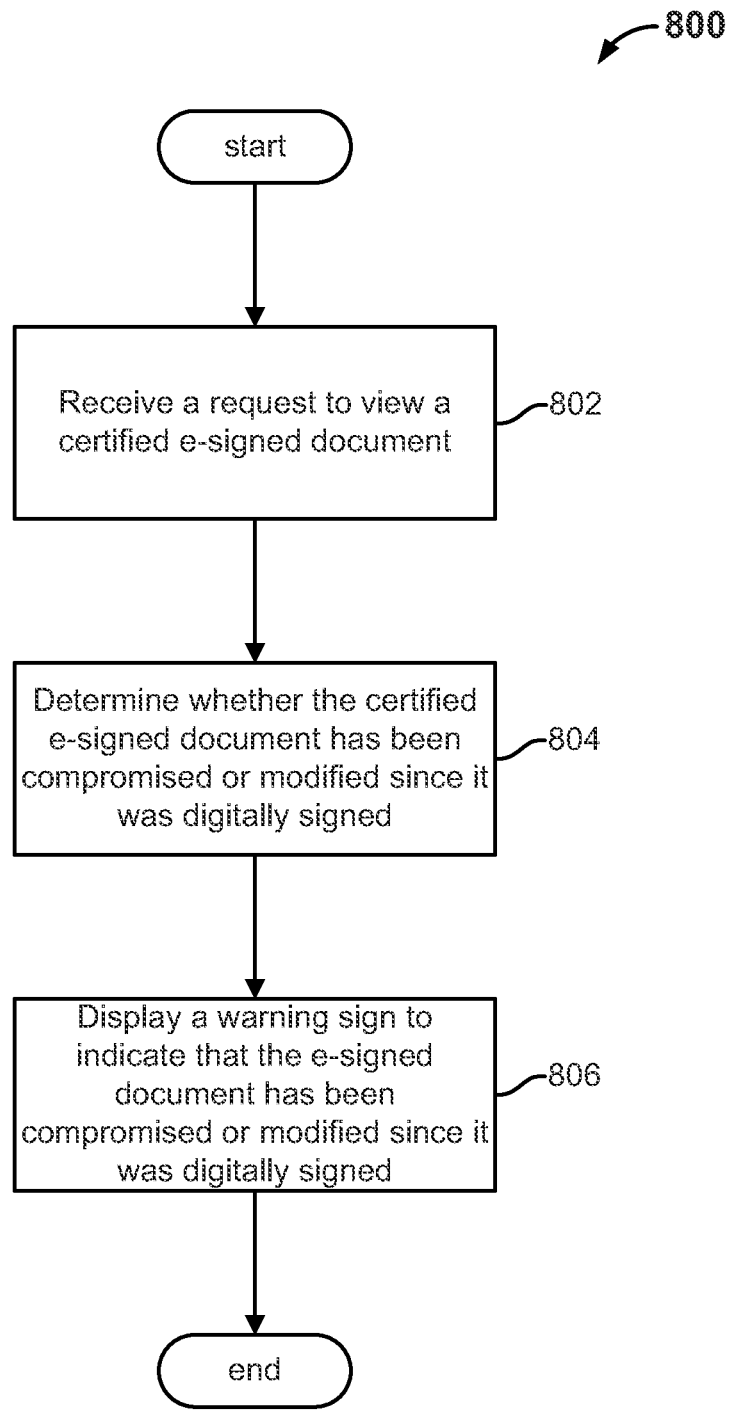
FIG. 8 is another flow diagram for providing a self-contained electronic signature in accordance with some embodiments.

FIG. 8 is another flow diagram for providing a self-contained electronic signature in accordance with some embodiments. At 802, a request to view a certified e-signed document is received. At 804, determining whether the certified e-signed document has been compromised or modified since it was digitally signed by an e-signature service provider is performed. At 806, display a warning sign to indicate that the e-signed document has been compromised or modified since it was digitally signed by an e-signature service provider is performed.

Figure 9:
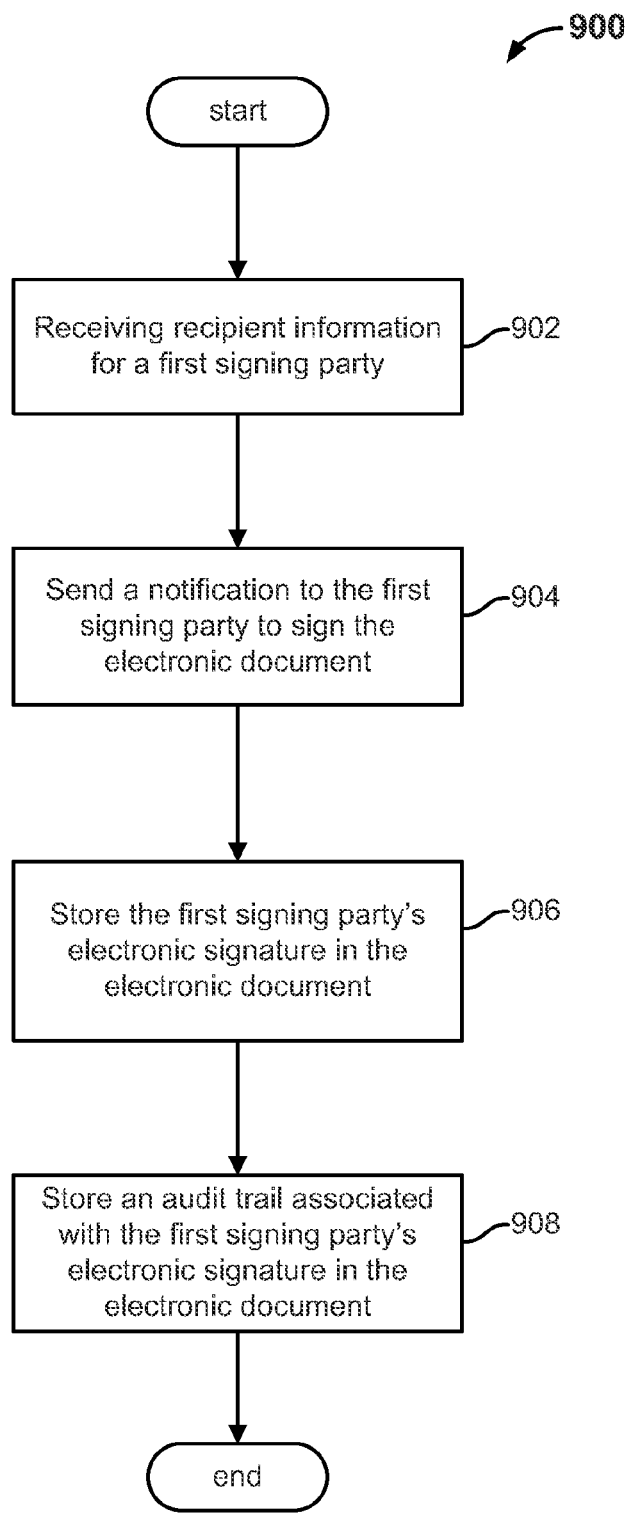
FIG. 9 is another flow diagram for providing a self-contained electronic signature in accordance with some embodiments.

FIG. 9 is another flow diagram for providing a self-contained electronic signature in accordance with some embodiments. At 902, receiving recipient information for a first signing party is performed. At 904, sending a notification to the first signing party to sign the electronic document is performed. At 906, storing the first signing party's electronic signature in the electronic document is performed. At 908, storing an audit trail associated with the first signing party's electronic signature in the electronic document is performed.

Figure 10:
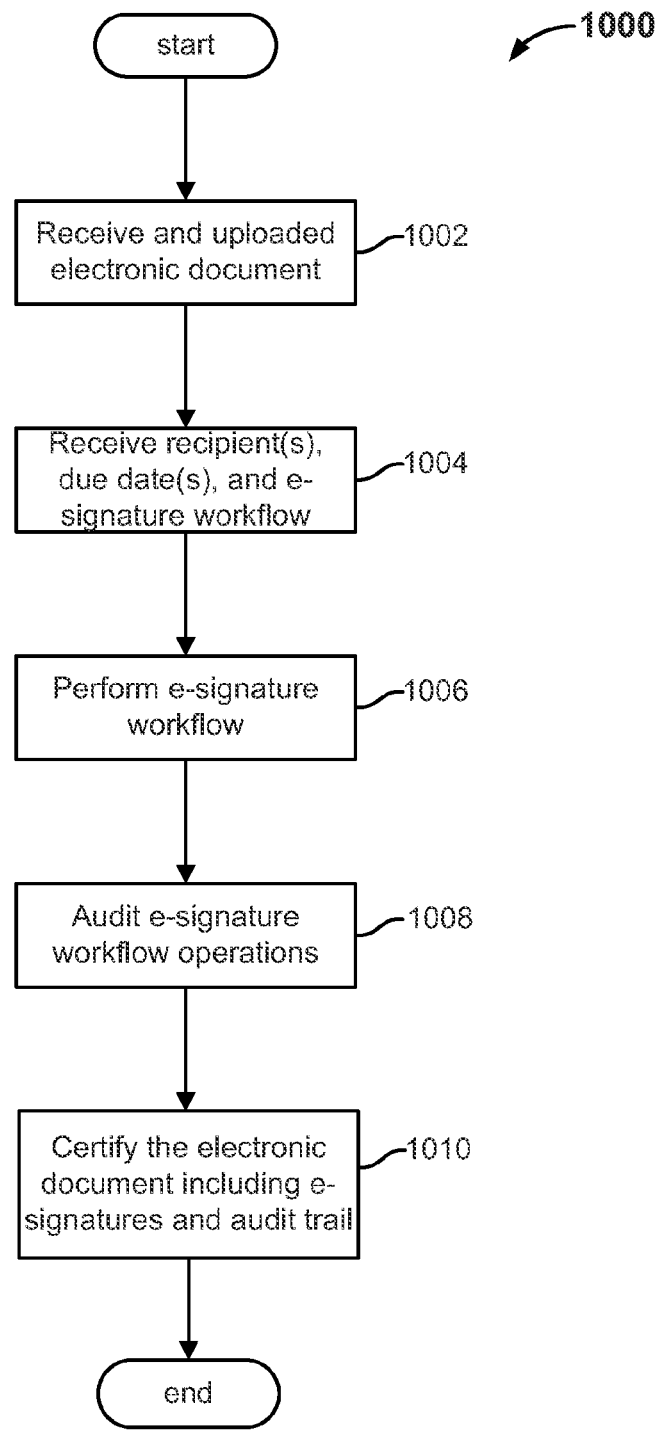
FIG. 10 is another flow diagram for providing a self-contained electronic signature in accordance with some embodiments.

FIG. 10 is another flow diagram for providing a self-contained electronic signature in accordance with some embodiments. At 1002, an electronic document is received for uploading. At 1004, recipient(s) information, due date(s) for electronic signing information, and input for an e-signature workflow process is received. At 1006, an e-signature workflow is performed to facilitate the electronic signing of the document by each recipient (e.g., required signing party). At 1008, audit trail data is generated for audit data associated with each electronic signature and the e-signature workflow operations. At 1010, the electronic document is certified by the e-signature platform service provider, in which the embedded e-signatures, the embedded audit trail data, and the original electronic document itself are secured.

Although the foregoing embodiments have been described in some detail for purposes of clarity of understanding, the techniques disclosed herein are not limited to the details provided. There are many alternative ways of implementing the techniques disclosed herein. The disclosed embodiments are illustrative and not restrictive.

What is claimed is:

1. A system, comprising:
a processor configured to:
   receive an electronic signature, wherein the electronic signature is inputted on an interface for signing an electronic document;
   record an audit trail comprising descriptions for a plurality of events associated with the electronic signature of the electronic document and comprising a plurality of timestamps associated with the plurality of events, the plurality of events comprising a request for the electronic signature, an access to the electronic document, and an input of the electronic signature in the electronic document;
   embed the audit trail in the electronic document; and
   cause the electronic document to be secured with a key to generate a digital signature, wherein the electronic document includes the embedded audit trail and the electronic signature, and wherein the digital signature secures the document; and
a memory coupled to the processor and configured to provide the processor with instructions.

2. The system recited in claim 1, wherein the audit trail is embedded in metadata of the electronic document, a body of the electronic document, or both the metadata and body of the electronic document, and wherein digitally signing the electronic document includes a certifying signature provided by a service provider of an electronic signature service.

3. The system recited in claim 1, wherein the processor is further configured to:
   embed the audit trail in metadata of the electronic document.

4. The system recited in claim 1, wherein the processor is further configured to:
   receive the electronic document for electronic signature workflow processing.

5. The system recited in claim 1, wherein the processor is further configured to:
   receive workflow input for electronic signature workflow processing.

6. The system recited in claim 1, wherein the processor is further configured to:
   receive signing party recipient information.

7. The system recited in claim 1, wherein the processor is further configured to:
   receive recipient information for a first signing party; and
   send a notification to the first signing party to sign the electronic document.

8. The system recited in claim 1, wherein the processor is further configured to:
   receive recipient information for a first signing party;
   send a notification to the first signing party to sign the electronic document; and
   store the first signing party's electronic signature in the electronic document.

9. The system recited in claim 1, wherein the processor is further configured to:
   receive recipient information for a first signing party;
   send a notification to the first signing party to sign the electronic document;
   store the first signing party's electronic signature in the electronic document; and
   store an audit trail associated with the first signing party's electronic signature in the electronic document.

10. The system of claim 1, wherein the electronic signature comprises data indicative of a user electronically signing the electronic document by way of the interface.

11. The system of claim 1, wherein at least one event of the plurality of events is indicative of an activity of electronically signing the electronic document, and wherein the audit trail comprises information descriptive of the plurality of events.

12. The system of claim 1, wherein the key for generating the digital signature is associated with the system, and wherein the processor is further configured to:
   allow a user to define a workflow for electronically signing the electronic document, the workflow identifying a plurality of recipients of the electronic document and an order for electronically signing the electronic document by the plurality of recipients; and
   in response to an execution of the workflow:
      provide the interface to a recipient of the plurality of recipients, the interface configured to present the electronic document to the recipient and to allow the recipient to electronically sign the electronic document based on the order identified in the workflow;
      determine circumstances associated with presenting the electronic document and receiving the electronic signature by way of the interface; and
      record information about the circumstances, the execution of the workflow, the user, and the recipient in the audit trail.

13. A computer implemented method, comprising:
   receiving an electronic signature of an electronic document, the electronic signature comprising data indicative of a user electronically signing the electronic document using an interface;
   recording an audit trail comprising descriptions for a plurality of events associated with the electronic signature of the electronic document, the plurality of events comprising a request for the electronic signature, an access to the electronic document, and an input of the electronic signature in the electronic document;
   embedding the audit trail in the electronic document; and
   digitally signing the electronic document, the audit trail, and the electronic signature, wherein the electronic document, the embedded audit trail, and the electronic signature are secured by a digital signature.

14. The computer implemented method in claim 13, wherein the audit trail is embedded in metadata of the electronic document, a body of the electronic document, or both the metadata and body of the electronic document, and wherein digitally signing the electronic document includes a certifying signature provided by a service provider of an electronic signature service.

15. The computer implemented method in claim 13, further comprising:
   embedding the audit trail in metadata of the electronic document.

16. The computer implemented method in claim 13, further comprising:
   receiving recipient information for a first signing party;
   sending a notification to the first signing party to sign the electronic document;
   storing the first signing party's electronic signature in the electronic document; and
   storing an audit trail associated with the first signing party's electronic signature in the electronic document.

17. A computer program product, the computer program product being embodied in a non-transitory computer readable storage medium and comprising computer instructions for:
   receiving an electronic signature of an electronic document, the electronic signature comprising data indicative of a user electronically signing the electronic document using an interface;
   recording an audit trail comprising descriptions for a plurality of events associated with the electronic signature of the electronic document, the plurality of events comprising a request for the electronic signature, an access to the electronic document, and an input of the electronic signature in the electronic document;
   embedding the audit trail in the electronic document; and
   digitally signing the electronic document, the audit trail, and the electronic signature, wherein the electronic document, the embedded audit trail, and the electronic signature are secured by a digital signature.

18. The computer program product recited in claim 17, wherein the audit trail is embedded in metadata of the electronic document, a body of the electronic document, or both the metadata and body of the electronic document, and wherein digitally signing the electronic document includes a certifying signature provided by a service provider of an electronic signature service.

19. The computer program product recited in claim 17, further comprising computer instructions for:
   embedding the audit trail in metadata of the electronic document.

20. The computer program product recited in claim 17, further comprising computer instructions for:
   receiving recipient information for a first signing party;
   sending a notification to the first signing party to sign the electronic document;
   storing the first signing party's electronic signature in the electronic document; and
   storing an audit trail associated with the first signing party's electronic signature in the electronic document.

21. A computer-implemented method, comprising:
   verifying an authenticity of a digitally signed electronic document, wherein the digitally signed electronic document includes an embedded audit trail and an electronic signature secured by a digital signature, wherein the digital signature is generated based on a cryptography process applied to the document, wherein the electronic signature is generated based on a user input independent of a cryptography process, wherein the audit trail comprises a record of a plurality of events associated with the electronic signature, and wherein the plurality of events comprise a request for the electronic signature, an access to the electronic document, and an input of the electronic signature in the electronic document;
   displaying the electronic signature; and
   receiving a request to display the embedded audit trail.

22. The computer-implemented method recited in claim 21, wherein the audit trail is embedded in metadata of the electronic document, a body of the electronic document, or both the metadata and body of the electronic document, and wherein digitally signing the electronic document includes a certifying signature provided by a service provider of an electronic signature service.

23. The computer-implemented method recited in claim 21, wherein a copy of the digitally signed electronic document is stored by an online e-signature service.

* * * * *